United States Patent
Pourabolghasem et al.

(10) Patent No.: US 11,565,185 B2
(45) Date of Patent: Jan. 31, 2023

(54) METHOD AND SYSTEM FOR AUTOMATIC AND INTERACTIVE MODEL TRAINING USING DOMAIN KNOWLEDGE IN VIDEO GAMES

(71) Applicant: Electronic Arts Inc., Redwood City, CA (US)

(72) Inventors: Reza Pourabolghasem, San Mateo, CA (US); Meredith Trotter, San Francisco, CA (US); Sundeep Narravula, Saratoga, CA (US); Navid Aghdaie, San Jose, CA (US); Kazi Zaman, Foster City, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 257 days.

(21) Appl. No.: 16/835,907

(22) Filed: Mar. 31, 2020

(65) Prior Publication Data

US 2021/0299573 A1 Sep. 30, 2021

(51) Int. Cl.
*A63F 13/75* (2014.01)
*A63F 13/77* (2014.01)
*G06N 5/04* (2006.01)
*G06N 20/00* (2019.01)

(52) U.S. Cl.
CPC ............. *A63F 13/75* (2014.09); *A63F 13/77* (2014.09); *G06N 5/04* (2013.01); *G06N 20/00* (2019.01); *A63F 2300/552* (2013.01); *A63F 2300/5586* (2013.01)

(58) Field of Classification Search
CPC .... A63F 13/75; A63F 13/77; A63F 2300/552; A63F 2300/5586; G06N 5/04; G06N 20/00
See application file for complete search history.

(56) References Cited

U.S. PATENT DOCUMENTS

| | | | | |
|---|---|---|---|---|
| 10,135,723 | B2 * | 11/2018 | Aggarwal | H04L 45/46 |
| 2006/0010136 | A1 * | 1/2006 | Deangelo | G06F 16/93 |
| 2019/0147297 | A1 * | 5/2019 | Rogers | G06F 16/904 |
| | | | | 706/12 |
| 2021/0038979 | A1 * | 2/2021 | Bleasdale-Shepherd | |
| | | | | G06N 20/20 |

OTHER PUBLICATIONS

Ratner, Alexander et al., "Data Programming: Creating Large Training Sets, Quickly," dated May 26, 2016, Retrieved from https://arxiv.org/abs/1605.07723.

(Continued)

*Primary Examiner* — Thomas H Henry
(74) *Attorney, Agent, or Firm* — Middleton Reutlinger (57) ABSTRACT

A computer-implemented method is provided of allowing a user to automatically transform domain knowledge into a machine learning model to be used in real-time operation of video games. The method comprises providing a user interface which allows a user to define domain knowledge relating to a video game by specifying one or more labeling functions; transforming the labeling functions into executable code; labeling raw data relating to the video game using the executable code to obtain labeled data; and applying an automated machine learning module to the labeled data to obtain a machine learning model.

20 Claims, 5 Drawing Sheets

(56) References Cited

OTHER PUBLICATIONS

Ratner, Alexander et al., "Data Programming: Creating Large Training Sets, Quickly," 30th Conference on Neural Information Processing Systems, 2016, Retrieved from https://dawn.cs.stanford.edu/pubs/snorkel-nips2016.pdf.

Wikipedia, "Automated machine learning," Aug. 14, 2020, Retrieved from https://en.wikipedia.org/wiki/Automated_machine_learning.

Tennenbaum, Justin, "Automated Machine Learning," Towards Data Science, Oct. 21, 2019, Retrieved from https://towardsdatascience.com/automated-machine-learning-d8568857bda1.

Ozgen, Berk, "AutoML: In depth Guide to Automated Machine Learning [2020]," AI Multiple, Jun. 17, 2020, Retrieved from: https://blog.aimultiple.com/auto-ml/.

Wikipedia, "Random Forest," Oct. 19, 2020, Retrieved from : https://en.wikipedia.org/wiki/Random_forest.

Wikipedia, "Cheating in online games," Oct. 21, 2020, Retrieved from: https://en.wikipedia.org/wiki/Cheating_in_online_games.

Wikipedia, "Data-driven programming," Sep. 22, 2020, Retrieved from: https://en.wikipedia.org/wiki/Data-driven_programming.

* cited by examiner

| Menu bar | | | | ~ 410 |
|---|---|---|---|---|
| Feature | Operator | Threshold Value | Conclusion / Label | |
| <Feature 1> | > | value_1 | conc_1 | |
| <Feature 2> | = | value_2 | conc_2 | |
| <Feature 3> | < | value_3 | conc_3 | |
| Firing Accuracy | = | 100% | cheating | ~ 400 |
| Time of uninterrupted play | > | 5h | cheating | |
| Average reaction time | < | 0.4s | cheating | |
| Average reaction time | between | 0.4s, 0.6s | dextrous player | |

| Importance | ~ 420 |
|---|---|
| 1. <Feature 6> | |
| 2. <Feature 4> | |
| 3. <Feature 1> | |
| • | |
| • | |
| • | |

FIG. 4

METHOD AND SYSTEM FOR AUTOMATIC AND INTERACTIVE MODEL TRAINING USING DOMAIN KNOWLEDGE IN VIDEO GAMES

BACKGROUND

In recent times, the number of technological fields in which Machine Learning, ML, is successfully employed has been steadily increasing. Machine learning is typically subdivided into unsupervised learning, supervised learning, reinforcement learning etc. One difference between supervised and unsupervised learning approaches is that the fact that supervised learning algorithms rely on labeled training datasets which are not necessary for unsupervised learning. In the last decade many machine learning breakthroughs in the field of supervised learning have been made possible by the release of new labeled datasets which have become valuable assets since such datasets have increasingly become instrumental in building applications in science and industry. However, large hand-labeled training sets are currently not yet available for many real-world applications and are expensive to create since labelers have to be experts in the application domain and the process of labeling is time consuming.

Building a machine learning model that is able to classify objects, behaviour or any other entities requires the specialist knowledge of data scientists who have to apply appropriate data pre-processing, feature engineering, feature extraction, and feature selection methods that make the dataset usable for machine learning. By contrast, experts in the application domain, e.g. in the domain of multi-player video games, have domain knowledge in the field in which the machine learning model is going to be applied but typically do not have the required specialist knowledge of data scientists.

In the field of video games, it is thus required to enable a person who does not have specialist knowledge of a data scientist to create a machine learning model that allows him to classify the behaviour of players. For example, in multi-player online games, there may be game integrity teams who check whether players are cheating. It would be desirable if these people based on their domain knowledge could create a machine learning model that allows automatic detection of cheating or other anomalies during real-time operation of video games.

SUMMARY

The present disclosure relates to automatic and interactive model training, and in particular to automatic and interactive model training in video games.

One exemplary embodiment of the disclosed subject matter is a computer-implemented method of allowing a user to automatically transform domain knowledge into a machine learning model to be used in video games. The method comprises providing a user interface which allows a user to define domain knowledge relating to a video game by specifying one or more labeling functions; transforming the labeling functions into executable code; labeling raw data relating to the video game using the executable code to obtain labeled data; and applying an automated machine learning module to the labeled data to obtain a machine learning model.

A second exemplary embodiment of the disclosed subject matter is a computer-readable medium that when executed by a processor causes the processor to perform the method of any one of the preceding claims.

A third exemplary embodiment of the disclosed subject matter is a trained machine-learning model to be used in real-time operation of video games, wherein the model is obtained by performing the following steps: providing a user interface which allows a user to define domain knowledge relating to a video game by specifying one or more labeling functions; transforming the labeling functions into executable code; labeling raw data relating to the video game using the executable code to obtain labeled data; and applying an automated machine learning module to the labeled data to obtain a machine learning model.

A fourth exemplary embodiment of the disclosed subject-matter is a method of analysing the behaviour of a player in real-time, the method comprising receiving real-time input control data of a game controller used by a player; running the trained machine learning model of the third exemplary embodiment with the received real-time input control data; and analysing the behaviour of the player in real-time.

A fifth exemplary embodiment of the disclosed subject-matter is a gaming system, comprising a data storage on which the trained machine learning model of the third exemplary embodiment resides; an input interface configured to receive real-time input control data of a game controller used by a player; and a processor configured to run the trained machine learning model with the real-time input control data to analyse the behaviour of the player.

A sixth exemplary embodiment of the disclosed subject-matter is a distributed computing system comprising a data store on which a program resides that when executed is arranged to receive labeling functions defined by a user based on his domain knowledge; to transform the labeling functions into executable code; to label raw data relating to the video game using the executable code to obtain labeled data; and to distribute the labeled data to a plurality of compute nodes; and the plurality of compute nodes on which a program resides that when executed is arranged to receive the labeled data; and to apply an automated machine learning module to the labeled data to obtain a machine learning model.

BRIEF DESCRIPTION OF THE DRAWINGS

FIG. 4 also shows a ranking of features in a table which serves as a metric that is output to the user in addition to the machine learning model

DETAILED DESCRIPTION

Exemplary embodiments are described below with references to the accompanying drawings.

Figure 1:
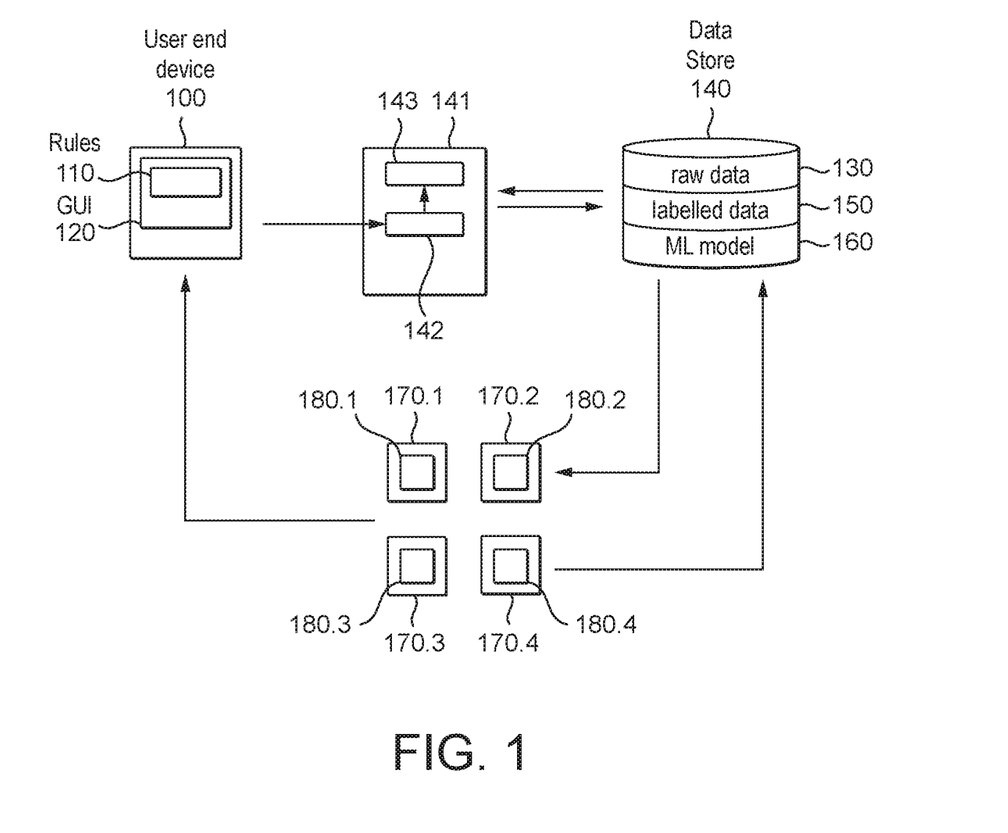
FIG. 1 shows an overview diagram about the process of obtaining a machine learning model based on domain knowledge input by a user.

FIG. 1 illustrates an overview of a system and method that allows a user to automatically transform his domain knowledge into a robust machine learning model.

The system combines three techniques—data programming using an intuitive user interface, automated labeled dataset generation, and automated machine learning, AutoML, to automatically translate the domain knowledge of experts into a machine learning model to be used in real-time operation of video games.

Embodiments relate to a computer-implemented method of allowing a user to automatically transform domain knowledge into a machine learning model to be used in real-time operation of video games. The method comprises providing a user interface which allows a user to define domain knowledge relating to a video game by specifying one or more labeling functions. The labeling functions are transformed into executable code. In some of the embodiments this is done by an act of parsing and/or compiling the labeling functions. The raw data relating to the video game are labeled using the executable code to obtain labeled data. An automated machine learning module, AutoML module, is applied to the labeled data to obtain a machine learning model.

In some of the embodiments, the machine learning model obtained is a robust machine learning model in which residual noise in the labeled data has been eliminated. Robustness is the property that tested on a training dataset and on a similar testing dataset, the performance is close.

In some of the embodiments, a hyperparameter optimization is performed by the automated machine learning module to find an optimal machine learning model.

Large labeled training datasets are an essential condition for the success of many supervised learning methods. For some applications, creating labeled training datasets is the most time-consuming and expensive part of applying machine learning. Therefore, a paradigm for the programmatic creation of training datasets, called "data programming", has been proposed.

Data programming refers to the creation of training sets in which users encode their domain knowledge in form of domain heuristics as labeling functions which are (user-defined) programs that label subsets of the data. The labeling functions may be, for example, rules that are transformed into executable code. The labeling functions may be noisy and may conflict.

Data programming is considered to be a novel software engineering paradigm for the creation and management of training sets, for instance, when two labeling functions of differing quality and scope overlap and possibly conflict on certain training examples. While in prior approaches the user had to decide which one to use, or how to integrate them, this is accomplished in data programming by learning a model of the training set that includes both labeling functions. Additionally, users are often aware of, or able to induce, dependencies between their labeling functions. In data programming, users may be enabled to provide additional input, for example a dependency graph which indicates that two labeling functions are similar, or that one "fixes" or "reinforces" another.

Data programming is driven by the observation that users often have difficulties in selecting features for their models, which is an impediment for the development of models based on given training sets. However, it has been observed by many users that formulating labeling functions in the framework of data programming may be easier since their application is more intuitive. In other words, selecting the "right" features for a model is a highly complex task involving statistical considerations, while the selection of the "right" labeling function is easier since the labelling function is designed with the only aim to label data correctly.

Nevertheless, labeling functions are considered to be heuristics and may therefore lead to incorrect labeling. Labeling functions leading to mislabeled datasets are considered to be noisy labeling functions.

In some of the embodiments, the labeling functions are defined as rules that the user enters via a graphical user interface in a visual language. In some of the embodiments, the rule has the format of "if <condition> then <conclusion>". In some of the embodiments, the user selects via a drag & drop menu a feature that he would like to use in the condition of his rule, which is followed by a comparator, such as a mathematical operator <, =, > which is then followed by a threshold. The conclusion is then the label that is applied to the item of the dataset which fulfils the condition.

The success of machine learning, ML, relies on human machine learning experts to perform the following tasks: preprocess and clean the data, select and construct appropriate features, select an appropriate model family, optimize model hyperparameters, postprocess machine learning models and critically analyze the results obtained. However in recent years, progress has been made so that the process of obtaining a machine learning model can be partly automated in an approach that is called "automated machine learning", AutoML, which receives the raw dataset as input and outputs a deployable machine learning model by automating the tasks mentioned above. Automated machine learning may be considered as a tool (or set of tools) which provides methods and processes to make machine learning available for non-machine learning experts, to improve efficiency of machine learning and to accelerate research on machine learning. Several off-the-shelf packages are nowadays available which provide automated machine learning, for example AutoWEKA, Auto-sklearn, TPOT, $H_2O$ AutoML, TransmogrifAI and MLBox.

In some of the embodiments, automated machine learning is used to find an optimal machine learning model among a plurality of machine learning models. In some of the embodiments, the automated machine learning module not only provides an optimal machine learning model but also returns a metric to a user. The metric defines a ranking of the importance of the features used in the labeling functions. This, in turn allows the users to adapt or change the rules he has defined to obtain an improved machine learning model.

In some of the embodiments, the machine learning model obtained is used as part of an integrity checking module running on an online game server in order to detect anomalies during real-time operation of the video game. At the integrity checking module, an output of the machine learning model is generated based on input data related to real-time operation of the video game, wherein the output of the machine learning model indicates whether an anomaly is present during real-time operation of the video game.

For example, the machine learning model may be used to detect whether a player of the video game is cheating. In some of the embodiment, the labeling function is based on the accuracy in firing and in yet other embodiments, the labeling function defines that if a player's accuracy in firing is greater than 98%, then the player must be cheating.

Online cheating in gaming usually refers to modifying the game experience to give one player an advantage over others. Cheating in video games may be done via a third party program which modifies the game's code at runtime to give one or more players an advantage. In other situations, it is frequently done by changing the games files to change the game's mechanics which are rules and procedures that guide the player through the game as well as the reaction of the game to the player's moves.

In video games, cheating may be performed by means of a "bot", which may try to mimic how a human would play a game. Since bots are becoming more and more intelligent due to AI techniques, it also becomes more and more difficult to detect their cheating behaviour which has elicited a high level of competition in developing methodology to detect (or to measure) cheating behaviour. The present invention therefore suggests AI techniques as an appropriate tool to detect such cheating behaviour. In some of the embodiments, the method may be used to assess the manual dexterity of the player. If the reaction time is below a threshold value, the user may be considered as a dextrous player.

There are two main models of network architectures in multiplayer gaming: client-server model and peer-to-peer model. While in the client-server model, the server is in charge of information security and enforcing game rules, in the peer-to-peer gaming model, clients also run code to perform these tasks but are exposed to the same type of cheats as in the client-server model. With the increasing availability of high-speed networks, peer-to-peer models are nowadays less used.

In the client-server model, no information sent from a client should be accepted by a server if it breaks the game rules or the basic mechanics of the game. And vice versa, no information should be sent from the server to a client unless needed. For example, a server with no rule enforcement or data integrity checking will synchronize all of the clients with all of the information about all of the other clients which makes operation of the server fast. On the other hand, some form of malicious software, in the context of gaming sometimes referred as "wallhack", may be able to reveal the location of the players in the game, the membership of teams, the state of players in terms of weapons, ammunition, health, etc. Moreover, a player may be able to break the game rules, manipulate the server or other clients based on altered and erroneous data from a client.

In some of the embodiments, the machine learning model obtained is a trained neural network (e.g. deep learning, convolutional neural network, etc.) while in other embodiments the method is applied on a trained random forest comprises a number of individual decision trees (sometimes also referred to as "classification trees") that operate as an ensemble. Each individual tree in the random forest outputs a class prediction and the class with the most votes becomes the model's prediction. The concept behind random forests relies on the wisdom of crowds. The reason that the random forest model works well is that a large number of relatively uncorrelated models (trees) operating as a committee will outperform any of the individual constituent models. An advantage of random forests may be seen in their property not to over fit to their training dataset and the number of trees may easily be scaled up and down. However, it should be noted that in other embodiments further supervised learning methods such as linear regression, logistic regression, support vector machines, naïve Bayes and k-nearest neighbour are used.

In some of the embodiments, once the raw data has been labeled it is stored in a central data store. From there, the labeled data is distributed among compute nodes where the automated machine learning module is applied to the labeled data in form of a distributed programme. In some of the embodiments, the compute nodes are part of the same data centre.

In some of the embodiments, the raw data relating to the video game is derived from or comprises input control data obtained from a game controller. In other words, the raw data is functional data which is generated by a game player manipulating a game controller, such as a joystick, gamepad, keyboard etc. and is used to control the actions of a player (or its avatar) as displayed on a screen. In some of the embodiments, the raw data relating to the video game comprises sequential data that represents actions (e.g. physical actions such as jumps, runs, shots, fights, etc.) performed by a player in a gaming environment. In some of the embodiments, the raw data is recorded data that represents a game sequence played by a user. In yet other embodiments, the raw data comprises state data that reflects the state of an avatar that the player is directing through a gaming environment. The state data may relate to the health state, amount of ammunition the avatar is carrying, weapons, etc. The raw data is the data that is automatically labeled by the labeling functions.

As mentioned above, cheating is nowadays often performed by AI bots that show intelligent behaviour which means that cheating detection also requires some form of AI. In some of the embodiments, the raw data is multi-dimensional data, i.e. data from a multi-dimensional feature space (i.e. vector space) where one dimension (among the many dimensions) is, for example, the accuracy in firing. The labeling function marks all vectors where the firing accuracy is greater than 98% as "cheating", all others as "non-cheating". In other words, in this embodiment, accuracy in firing is used as a discriminative feature for labeling. Then a machine learning model is determined based thereon.

In an operation/deployment phase, i.e. after the training has been completed, a vector is input into the model which is classified as "cheating" or "non-cheating". If the vector is similar to other vectors that have been labeled as "cheating" then the model will likely classify the input vector as a cheating, even if its accuracy in firing is far from 98%, because it has similarities in other dimensions.

In some of the embodiments, the machine learning model, which has been optimized by the automated machine learning module, is provided to the user together with metrics associated with the model. In some of the embodiments, the metrics is a ranking of the importance of features used in the labeling functions. Thereby, the user gets insight into the level of noise of the labeling functions he defined and is in a position to adapt or change the labeling functions in an iterative manner (feedback loop).

In some of the embodiments, the user interface is a graphical user interface that allows a user to define the labeling functions in form of rules by selecting from a list of features, an operator, such as a mathematical comparator, and a textbox.

Once the optimal machine learning model has been obtained, it can be installed on a game server as part of a game integrity module used to assess player behaviour, for example to detect cheating players in real-time. In operation, the data that represents actions performed by a player are input into the trained model, e.g. the trained neural network, and the trained model then outputs an assessment of the player's behaviour, e.g. that the player is cheating. In some of the embodiments, the data input in operation is real-time data representing the actions that the player is currently performing and the model can then output in real-time an assessment of whether the player is cheating or not.

Embodiments of the invention relate to a computer-readable medium storing instructions which, when executed by a processor, cause the processor to perform the method described above.

Embodiments of the invention relate to a trained machine learning model to be used in real-time operation of video games, wherein the model is obtained by performing the method described above.

Embodiments of the invention relate to a method of analysing the behaviour of a player in real-time, the method comprising receiving real-time input control data of a game controller used by a player; running the trained machine learning model described above with the received real-time input control data; and analysing the behaviour of the player in real-time.

Embodiments of the invention relate to a gaming system, comprising a data storage on which the trained machine learning model described above resides; an input interface configured to receive real-time input control data of a game controller used by a player; and a processor configured to run the trained machine learning model with the real-time input control data to analyse the behaviour of the player.

Embodiments of the invention relate to a distributed computing system, comprising a data store on which resides a program which when executed is arranged to receive a labeling functions defined by a user based on his domain knowledge; and to transform the received labeling functions into executable code; to label raw data relating to the video game using the executable code to obtain labeled data; and to distribute the labeled data to a plurality of compute nodes; and the plurality of compute nodes on which a program resides that when executed is arranged to receive the labeled data; and to apply the automated machine learning algorithm to the labeled data to obtain a machine learning model. In some of the embodiments, the distributed computing system further comprises a user end device on which a program resides that when executed is arranged to enable a user to define the labeling functions based on his domain knowledge in a user interface.

The technical effects achieved by the claimed invention enable a user to quickly and easily build a robust machine learning model based on his domain knowledge without the specialist knowledge of a data scientist and without the need of manual labeling. Hence, the construction of the machine learning model is simplified and improved. In the domain of video games, the method allows for an improved assessment/classification of a player's behaviour in real-time based on control input data representing (physical) actions performed by the player.

Returning now to FIG. 1 which shows an overview diagram of the system and process that allows a user to transform his domain knowledge into a robust machine learning model. A user at an end device 100 (client), for example a member of a game integrity team who supervises if players are cheating, enters his domain knowledge in form of rules 110 into a graphical user interface 120. In this example, the user formulates a rule that says that if a player has an accuracy in firing of 100%, he must be a cheater. This rule is a heuristic that stems from the user's domain knowledge. This rule is used as a labeling function to automatically label raw data 130 stored in a data store 140. Since the rules 110 are defined in a visual language, the rules 110 are sent to a computing system 141 (server) on which a parser/compiler 142 which translates the rules in to executable code 143. The executable code 143, which is executed on the computing system 141, transforms the raw data 130 into labeled data 150. The raw data 130 is for example high-dimensional data which reflect the actions performed by a player. If the raw data 130 indicates that the player has always hit the targets, i.e. the accuracy in firing dimension of a data item is 100%, then this raw data item will be labeled as "cheating". The labeled data 150 is distributed to a plurality of compute nodes 170 where a (distributed) automated machine learning module 180 is operating. The automated machine learning module 180 determines a robust machine learning model 160 based on the input labeled data 150. In the present example, the machine learning model 160 is a random forest, but could be any other supervised machine learning model. In order to achieve this, the automated machine learning module 180 performs for example hyperparameter optimization and other automated machine learning methods to obtain an optimal machine learning model 160 which is stored back into the data store 140. In addition to that, the obtained machine learning model 160 is also provided to the user with some metrics as a feedback. The metrics indicate, for example, a ranking of importance of the features used in the rules defined by the user. Thereby, the user can analyse the rule(s) he has defined and may re-formulate the rule(s) or add further rules and may obtain a new improved machine learning model 160 in an iterative manner.

Figure 2A:
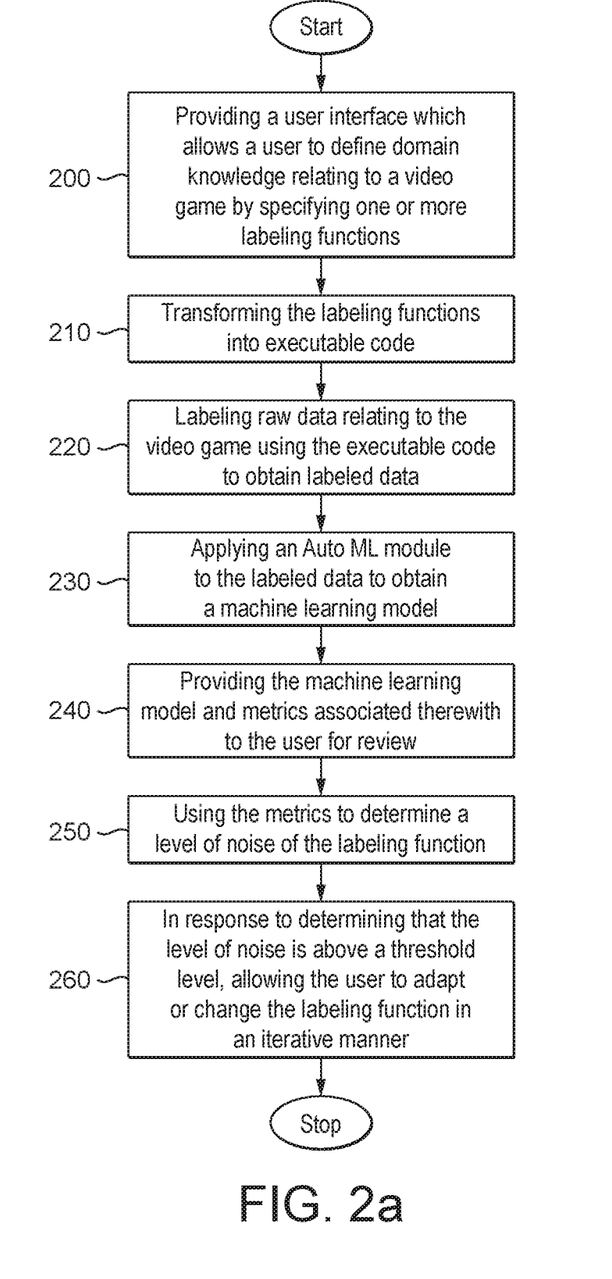
FIGS. 2a and 2b show flowcharts illustrating a method that allows a user to automatically transform his domain knowledge into a robust machine learning model.

FIG. 2a shows a flowchart which indicates the steps of a method that allows a user to automatically transform their domain knowledge into a robust machine learning model. At 200, a user is provided with a user interface which allows the user to define domain knowledge relating to a video game by specifying one or more labeling functions, e.g. in form of rules.

At 210, the labeling functions are transformed into executable code by a parser or a compiler.

At 220, raw data relating to the video game are labeled using the executable code to obtain the labeled data.

At 230, an automated machine learning module is applied to the labeled data to obtain a (robust) machine learning model.

At 240, the machine learning model and metrics associated therewith is provided to the user for review.

At 250, the metrics is used to determine a level of noise of the labeling functions.

At 260, in response to determining that the level of noise is above a threshold level, the user is allowed to adapt or change the labeling functions in an iterative manner.

Figure 2B:
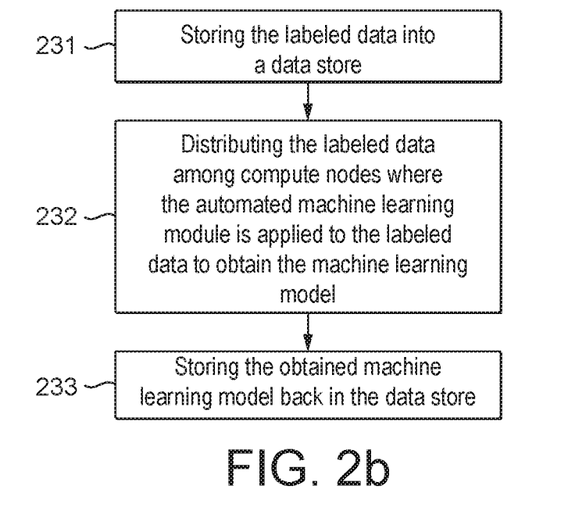

FIG. 2b shows a specific distributed implementation of method step 230. At 231, the labeled data is stored in a data store. At 232, from there, the labeled data is distributed among compute nodes where the automated machine learning module is applied to the labeled data to obtain the machine learning model. At 233, the obtained machine learning model is stored back in the data store.

Figure 3:
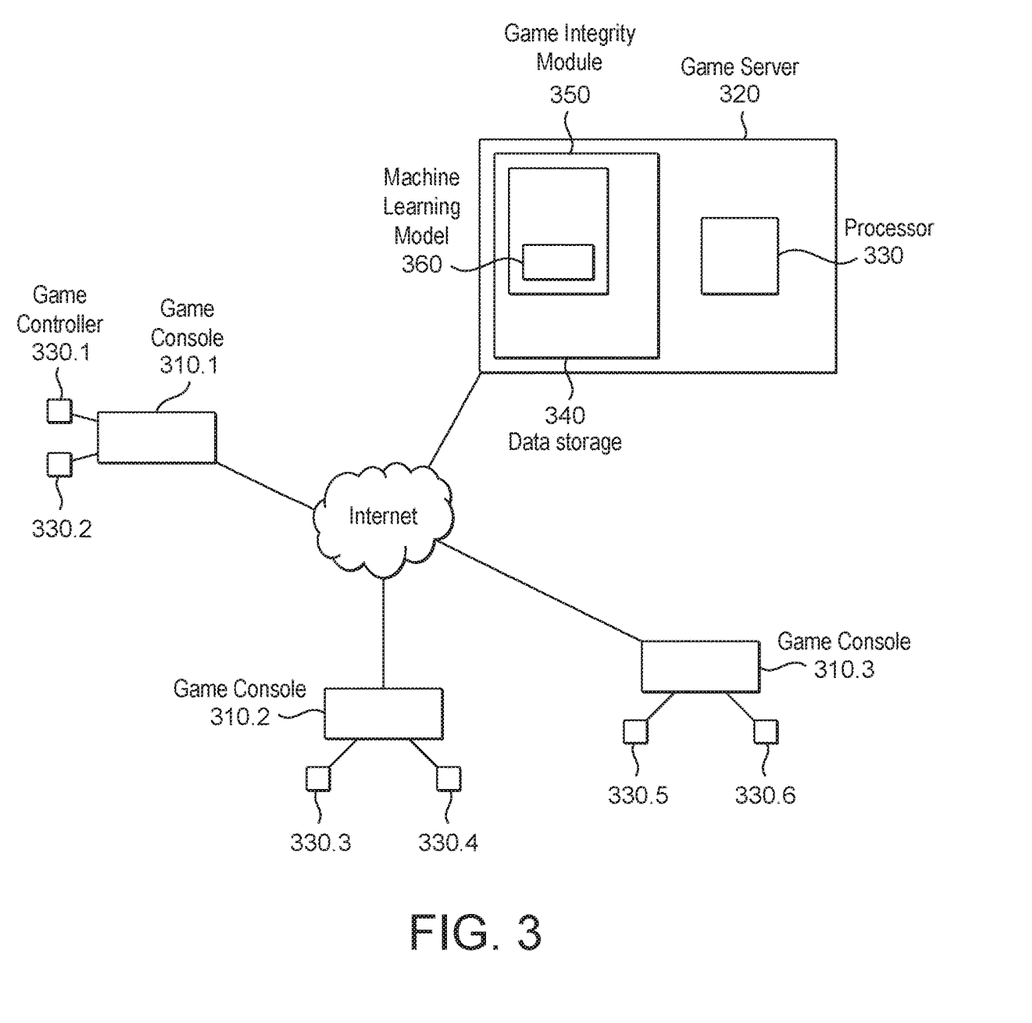
FIG. 3 is an overview diagram of an online gaming environment in which a trained machine learning model can be employed to analyse behaviour of users.

FIG. 3 shows a multiplayer online gaming multiplayer environment which comprises a set of games consoles 310 that are connected via the Internet with a central game server 320. Each game console 310 is handled by a player with a game controller 330 for example to control an avatar in a game. The game server 320 is a computing device with a processor 330 and a data storage 340 on which resides a game integrity module 350 which comprises a trained machine learning model 360 that is obtained by the method shown in FIG. 2. In operation, the trained machine learning model 360 receives real-time data that represents actions performed by a player and then is able to determine whether the player is cheating or not.

Figure 4:
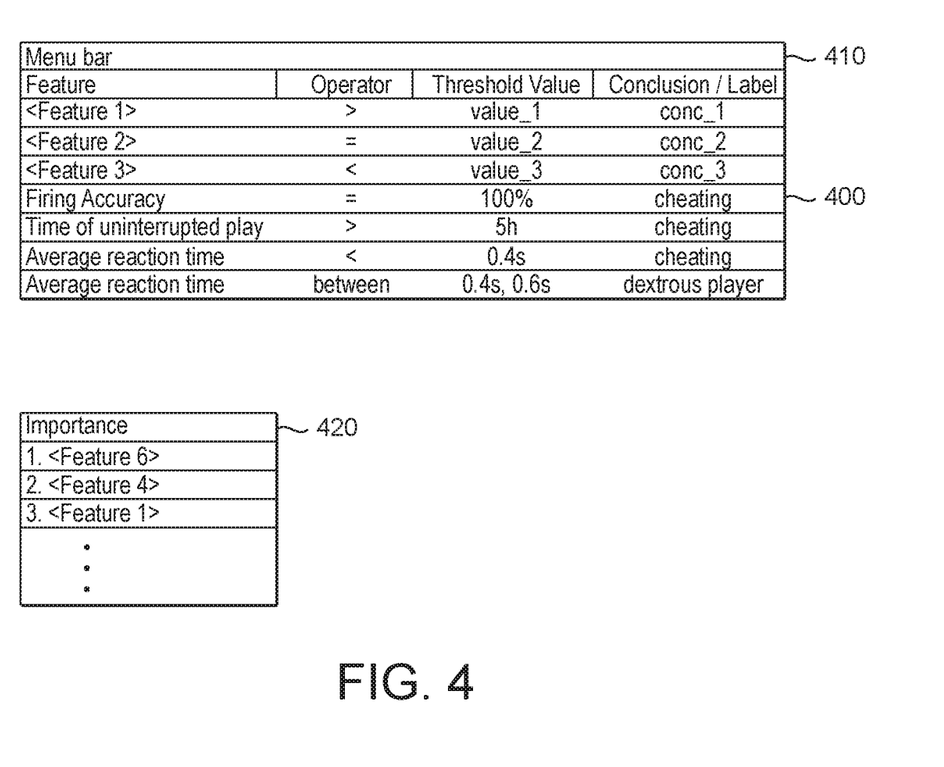
FIG. 4 shows a user interface in which a user may specify labeling functions in form of rules.

FIG. 4 shows a graphical user interface 400 in which a user is enabled to define rules in a visual language. The user may select features from a menu bar 410 by means of a drag & drop menu. One feature is "accuracy in firing". One exemplary rule is defined as the following condition: If "accuracy in firing" "=" "100%", then "cheating" is output as a conclusion. While the graphical user interface 400 is an interface for the user to input rules. Another feature is "average reaction time". In one rule, if the average reaction time is below 0.4 seconds, the conclusion is that the user is classified as a cheater because such a reaction time is not possible for a human being. If the reaction time is between 0.4 seconds and 0.6 seconds, the user is classified as a dextrous player. FIG. 4 also shows the output that the user receives. In this example, the user receives as output a metrics table 420 which ranks the individual features of the rules according to their importance in the obtained machine learning model. This metrics table gives the user more insight into the machine learning model obtained and allows him to improve the model.

The flowchart and block diagrams in the Figures illustrate the architecture, functionality, and operation of possible implementations of systems, methods and computer program product according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based system that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject-matter may be embodied as a system, method or computer program product. Accordingly, the disclosed subject-matter may take the form of an entirely hardware embodiment, and entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically capture, via, for instance, optical scanning of the paper or other medium, the compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method of allowing a user to automatically transform domain knowledge into a machine learning model to be used in real-time operation of video games, the method comprising:
provide a user interface via a user computing device, the user interface being configured to allow a user to input domain knowledge relating to a video game by specifying-one or more labeling functions;

receiving, from the user computing device, the labeling functions;

transforming the labeling functions into executable code;

labeling raw data relating to the video game using the executable code to obtain labeled data;

applying an automated machine learning module to the labeled data to obtain a machine learning model; and transmitting, to the user computing device, the obtained machine learning model and metrics associated with the obtained machine learning model, wherein the user interface is further configured to allow the user to adapt or change the labeling functions based on the metrics for use in obtaining a further machine learning model.

2. The computer-implemented method of claim 1, wherein the machine learning model obtained by the application of the automated machine learning module is a robust machine learning model in which residual noise in the labeled data has been eliminated.

3. The computer-implemented method of claim 1, wherein a hyperparameter optimization is performed by the automated machine learning module to find an optimal machine learning model.

4. The computer-implemented method of claim 1, wherein the machine learning model obtained is used as part of an integrity checking module running on an online games server in order to detect anomalies during real-time operation of the video game, wherein the method further comprises, at the integrity checking module: generating an output of the machine learning model based on input data related to real-time operation of the video game, wherein the output of the machine learning model indicates whether an anomaly is present during real-time operation of the video game.

5. The computer-implemented method of claim 4, wherein the output of the machine learning model indicates whether a player of the video game is cheating.

6. The computer-implemented method of claim 5, wherein the labeling function is based on an accuracy in firing.

7. The computer-implemented method of claim 6, wherein the labeling function defines that if a player's accuracy in firing is greater than 98%, then the player must be cheating.

8. The computer-implemented method of claim 1, wherein the machine learning model obtained is a trained neural network or a trained random forest.

9. The computer-implemented method of claim 1, wherein applying the automated machine learning module to the labeled data to obtain a machine learning model comprises:

storing the labeled data in a data store;

distributing the labeled data among compute nodes where the automated machine learning module is applied to the labeled data to obtain the machine learning model; and storing the obtained machine learning model back in the data store.

10. The computer-implemented method of claim 1, wherein the labeling functions are specified in the form of rules defined in a visual language.

11. The computer-implemented method of claim 1, wherein the raw data relating to the video game is derived from or comprises input control data obtained from a game controller.

12. The computer-implemented method of claim 11, wherein the raw data relating to the video game comprises sequential data that represents actions performed by a player in a gaming environment.

13. The computer-implemented method of claim 1, further comprising:

outputting, via the user interface, the metrics in the form of a metrics table which ranks individual features associated with the labeling functions according to their importance in the obtained machine learning model; and allowing, via the user interface, the user to analyse the features and, if required, to reformulate or add further labeling functions for use in obtaining the further machine learning model in an iterative manner.

14. The computer-implemented method of claim 13, further comprising using the metrics to determine a level of noise of the labeling function; and in response to determining that the level of noise of the labeling function is above a threshold level, allowing the user to adapt or change the labeling function in an iterative manner.

15. The computer-implemented method of claim 1, wherein the user interface is a drag-and-drop menu that allows a user to define the labeling functions in the form of rules by selecting from a list of features, an operator, a threshold value and a conclusion.

16. A non-transitory computer readable medium comprising a trained machine learning model to be used in real-time operation of video games, wherein the model is obtained by performing the following steps:

providing a user interface via a user computing device, the user interface being configured to allow a user to input domain knowledge relating to a video game by specifying one or more labeling functions;

receiving, from the user computing device, the labeling functions;

transforming the labeling functions into executable code;

labeling raw data relating to the video game using the executable code to obtain labeled data;

applying an automated machine learning module to the labeled data to obtain a machine learning model; and transmitting, to the user computing device, the obtained machine learning model and metrics associated with the obtained machine learning model;

wherein the user interface is further configured to allow the user to adapt or change the labeling functions based on the metrics for use in obtaining a further machine learning model.

17. A distributed computing system, comprising a non-transitory data store on which a program resides that when executed is arranged to:

receive labeling functions input, via a user interface on a user computing device, by a user based on his domain knowledge; and to transform the received labeling functions into executable code;

label raw data relating to a video game using the executable code to obtain labeled data; and distribute the labeled data to a plurality of compute nodes; and the plurality of compute nodes on which a program resides that when executed is arranged to:

receive the labeled data; apply the automated machine learning algorithm to the labeled data to obtain a machine learning model;

transmit, to the user computing device, the obtained machine learning model and metrics associated therewith, wherein the user interface is further configured to allow the user to adapt or change the labeling functions based on the metrics; and the program further arranged to receive the adapted or changed labeling functions for use in obtaining a further machine learning model; and transmit, to the user computing device, the obtained machine learning model and metrics associated with the obtained machine learning model, wherein the user interface is further configured to allow the user to adapt or change the labeling functions based on the metrics for use in obtaining the further machine learning model; and the program further arranged to receive the adapted or changed labeling functions for use in obtaining the further machine learning model.

18. The distributed computing system of claim 17, further comprising the user computing device on which a program resides that when executed is arranged to enable a user to input the labeling functions based on his domain knowledge in the user interface.

19. The distributed computing system of claim 17, further comprising an online games server comprising one or more processors configured to perform an integrity checking procedure to detect anomalies during real-time operation of the video game, the integrity checking procedure comprising generating an output of the machine learning model based on input data related to real-time operation of the video game, wherein the output of the machine learning model indicates whether an anomaly is present during real-time operation of the video game.

20. The distributed computing system of claim 19, wherein the output of the machine learning model indicates whether a player of the video game is cheating.

\* \* \* \* \*